United States Patent
Schedel et al.

(10) Patent No.: US 7,248,365 B2
(45) Date of Patent: Jul. 24, 2007

(54) METHOD FOR ADJUSTING A SUBSTRATE IN AN APPLIANCE FOR CARRYING OUT EXPOSURE

(75) Inventors: Thorsten Schedel, Dresden (DE); Martin Rössiger, Dresden (DE)

(73) Assignee: Infineon Technologies AG, Munich (DE)

( * ) Notice: Subject to any disclaimer, the term of this patent is extended or adjusted under 35 U.S.C. 154(b) by 238 days.

(21) Appl. No.: 10/717,413

(22) Filed: Nov. 19, 2003

(65) Prior Publication Data

US 2004/0100625 A1 May 27, 2004

(30) Foreign Application Priority Data

Nov. 19, 2002 (DE) ................. 102 53 919

(51) Int. Cl.
*G01B 11/00* (2006.01)
(52) U.S. Cl. .................................. 356/400
(58) Field of Classification Search ........ 356/399–401; 355/53, 43; 250/548
See application file for complete search history.

(56) References Cited

U.S. PATENT DOCUMENTS

| | | | |
|---|---|---|---|
| 4,952,060 A * | 8/1990 | Ina et al. ................. 356/401 |
| 5,121,160 A * | 6/1992 | Sano et al. ............... 355/53 |
| 5,184,196 A * | 2/1993 | Nakagawa et al. ........ 356/401 |
| 5,461,237 A | 10/1995 | Wakamoto et al. |
| 5,955,739 A * | 9/1999 | Kawashima ............... 250/548 |
| 5,991,005 A * | 11/1999 | Horikawa et al. .......... 355/53 |
| 6,411,387 B1 * | 6/2002 | Kaneko et al. ............ 356/401 |

FOREIGN PATENT DOCUMENTS

| | | |
|---|---|---|
| JP | 5-159998 | 6/1993 |
| JP | 09-219357 | 8/1997 |
| JP | 11-233430 | 8/1999 |

* cited by examiner

*Primary Examiner*—Gregory J. Toatley, Jr.
*Assistant Examiner*—Isiaka O. Akanbi
(74) *Attorney, Agent, or Firm*—Laurence A. Greenberg; Werner H. Stemer; Ralph E. Locher

(57) ABSTRACT

The unevennesses of a chuck are measured at various positions and are stored, as discrepancies from an idealized plane, in a databank. The measured discrepancies are used to calculate corrections for the predetermined settings for the focus distance and/or the tilt of the chuck. These corrections are in each case used differently for adjusting the respective exposure of the exposure areas.

2 Claims, 2 Drawing Sheets

METHOD FOR ADJUSTING A SUBSTRATE IN AN APPLIANCE FOR CARRYING OUT EXPOSURE

BACKGROUND OF THE INVENTION

Field of the Invention

The invention relates to a method for adjusting a substrate, which is covered by a photosensitive layer, in an exposure appliance for transferring a structure to the substrate. The appliance has a moving chuck for aligning the substrate, a radiation source, and at least one focusing device, preferably a magnetic or optical lens.

Chucks are used in the field of semiconductor manufacturing for holding and fixing substrates, particularly while carrying out lithographic, deposition, etching, polishing, and varnishing processes, etc. These processes are used for substrates such as semiconductor wafers, masks or reticules, or flat panels for forming structures. Since present-day structures have to be formed with sizes in the sub-µm range, the substrates must be mounted on the chucks such that they are extremely free of stresses and bending. In this case, they must have a contact area or surface that is matched to the respective rear face of the substrate. The substrate can be appropriately fixed on the chuck by suction from a suction apparatus (vacuum pumps), electrostatically, by the substrate's own weight, or in other ways.

There are particular requirements for the chucks in the case of semiconductor wafers. The surface of the chuck that faces the substrate has to have an evenness corresponding to the flat rear face of the wafer. Chuck unevenness that cannot be completely excluded may, for example, be transferred directly to the substrate by its own weight as it touches the chuck.

If an exposure step is carried out in an exposure appliance, such as a wafer stepper or scanner, to transfer a structure to the substrate, then variations, which are caused by unevenness, in the distance between the photosensitive layer that is formed on the substrate and the lens system can lead to fuzzy imaging. The distance between the photosensitive layer formed on the substrate and the lens system is known as the focus distance. Discrepancies from an ideal focus distance are referred to as defocusing. Typical extents for a process window to be achieved nowadays for focus distances are, for example, 0.5 µm These values will decrease further in the future.

The evenness of chucks in exposure appliances is measured regularly, for example, at intervals of a few weeks. A measurement such as this can be carried out using so-called "golden wafers". These golden wafers have a particularly planar surface when not subjected to any stresses. Exposure appliances are equipped with focus and tilt sensors which, for a given exposure area on the wafer, are able to measure the focus distance and any tilt of the surface relative to the lens or lens system, in order to compensate for any surface topography on the wafer.

In theory, it would be possible to use these sensors to measure the particular exposure area before each individual exposure step, and thus to adjust the wafer in order to compensate for the local unevenness. To do this, the focus distance and the tilt of the chuck, with the wafer resting on it, would have to be readjusted in each case.

In practice, however, this procedure is rarely feasible because of the large amount of time involved and the loss of productivity associated with it. A focus distance common to all of the exposure areas and a common value for the tilt are therefore specified for the adjustment of the substrate. These values can be obtained from averaged individual measurements for a first wafer of a batch.

As a consequence of this, areas on a semiconductor wafer which are affected by unevenness of a chuck are adjusted automatically to a focus distance or a tilt which leads locally to fuzzy imaging there, for example of structures which are projected from a mask onto the wafer.

The focus/tilt sensors are also used in the case of the golden wafer, in order to measure the chuck unevenness that are transferred to the golden wafer. The results of a measurement such as this are compared with tolerances that are specified by the appliance manufacturer. The chuck can be replaced or used again, depending on the comparison result. Replacement is normally due after about four years.

SUMMARY OF THE INVENTION

It is accordingly an object of the invention to provide a method for adjusting a substrate in an exposure appliance used for transferring a structure to the substrate, which overcomes the above-mentioned disadvantages of the prior art methods of this general type.

In particular, an object of the present invention is to provide a method enabling the reduction of the disadvantageous influences of unevenness of chucks on the manufacturing quality of substrates, in particular semiconductor wafers. A further object of the present invention is to reduce the effort for adjusting a semiconductor wafer in an exposure appliance.

With the foregoing and other objects in view there is provided, in accordance with the invention a method for adjusting a substrate, which is covered with a photosensitive layer, in an exposure appliance used for transferring a structure to the substrate. The appliance has a moving chuck for aligning the substrate, a radiation source, and at least one focusing device. The method includes steps of:

for at least one first position on the chuck, measuring any discrepancy between a surface of the chuck which faces the substrate and an idealized plane;

providing the substrate on the chuck;

selecting a first detail from a large number of details in the photosensitive layer, which represents a first exposure area on the substrate, such that the first position on the chuck projected into the photosensitive layer is located within or in the immediate vicinity of the first detail;

predetermining a common focus distance intended for the large number of details on the substrate;

calculating a first correction for the predetermined focus distance between the first detail on the substrate and the focusing device as a function of the measured discrepancy at the first position; and applying the first correction to the focus distance by moving the chuck to adjust the substrate in an exposure step for the first exposure area.

The unevennesses of a chuck are measured by determining discrepancies from an idealized plane. An idealized plane may essentially be assumed for the rear face of a semiconductor wafer. For example, this may be a measurement method based on the prior art, for example, using the golden wafer. The positions of the discrepancies are determined accurately, thus preferably resulting in a more detailed surface topography of the chuck.

In contrast to the prior art, the measured discrepancies are now not discarded once they have been used for classifying the chuck, but are in fact, stored in order to be used as presets for subsequent exposure processes, in particular for measurement and adjustment processes.

To do this, a stored value for a discrepancy at a position on the chuck, which is located underneath the present position of the exposure area is extracted for a detail, which represents an exposure area, in the photosensitive layer on the substrate. This may in this case be at least one value of a discrepancy at a first position or else two or more discrepancy values at two or more positions in the region of the exposure area. It is also possible for the discrepancy value to be located at a position outside the exposure area, but in its immediate vicinity. The critical factor is that the discrepancy which represents an unevenness can be locally associated with the exposure area or the detail in the photosensitive layer, in order to compensate for any defocusing caused by the unevenness during an exposure step.

A common focus distance, which is determined for a large number of exposure areas or details on the substrate, is preset in a next step. This is a distance between the substrate surface and the respective focusing device used for transferring the structures. In the case of wafer or mask exposure appliances, this may be an optical lens. In the case of reflection masks, mirrors or mirror systems are provided as focusing devices, and are covered by the invention. In the case of electron-beam or ion-beam projection appliances, magnetic or electromagnetic lenses are provided as a focusing device.

The step mentioned above makes it possible, for the respective substrate, to reduce the complexity for focusing and tilting the adjustment of the chuck to the necessary extent. There is no need to carry out a focusing step on each occasion for each individual exposure area. It is particularly advantageous for the corrections that have been determined according to the invention also to be used for the surface topography for all of the subsequent substrates in the same batch and having the same characteristics.

In the case of exposure appliances from Canon Inc., the focus/tilt sensors are used, for example, to measure the focus distance and the tilt of the substrate relative to the lens or the lens system for a number of exposure areas, thus making it possible to adjust the substrate using the moveable chuck.

A measurement such as this is used to take account of the complicated surface topography, in particular, of substrates which intrinsically have to have a number of layers and which have been subjected to a number of processes. Since the structures and circuits are identical for each exposure area on a substrate, the measurements of the focus distances and tilts are statistically averaged in order to obtain a common value for the focus distance and for the tilt. Until now, all the exposure areas of a wafer have been illuminated on the basis of this common focus distance and tilt.

According to the invention, although the predetermined value is taken into account, this predetermined focus distance is, however, individually and additionally corrected in a further step in each case, for each exposure area and detail, as a function of the measured discrepancy, in order to take account of the local unevenness in the photosensitive layer on the substrate. This is done by extracting the stored data such that it is possible to calculate the correction. The correction for the focus distance can be achieved locally by using the calculated value to move the chuck.

The depth of focus of a lithographic process can thus be improved as a function of different positions, by including the unevenness of the chuck directly in the focus and/or tilt calculation of an exposure system. This compensates even for only small unevennesses that are still within the specifications of the appliance manufacturer. The range of tolerances, that is to say the process window, is in consequence advantageously enlarged, and the manufacturing quality is correspondingly improved.

According to two further aspects of the present invention, regions or numbers of exposure areas that are used as exclusion areas for adjustment processes can be defined by accurately measuring the positions of the unevennesses.

A first aspect provides that these exposure areas must not be used for determining the value (which is predetermined jointly for the wafers in one batch) for the focus distance. The advantage is that the periodic measurements, as they demand calibration measurements, need no longer be carried out, by virtue of the present invention, to the extent that was necessary in the past. It has been possible to avoid relatively large errors by individual measurements by virtue of the large number of measurements in which the ideal focus distance or the ideal tilt of the chuck for exposure was in fact necessary because the unevennesses occurring on the chucks.

Since, according to the present invention, exposure areas which are affected in particular by unevennesses of the chuck located underneath are excluded, it is now possible to manage with a small number of focus distance measurements, so that the production rate on an exposure appliance increases.

According to the second further aspect, these exposure areas may not be used for the actual alignment process in the XY plane that is parallel to the surface of the wafer. The advantage is that the corresponding adjustment marks within these exposure areas are of poor quality and thus lead to inaccurate adjustment results.

Provision is also made for the present invention to be used in the field of metal processing, where the roughness of the surfaces of chucks plays a considerable role. Measurement of the surface and accurate position correction based on this for distances between substrates mounted thereon and the sources of the processes involved, such as lasers or focusing etching sources, can also lead to improved processing results in this case.

Other features which are considered as characteristic for the invention are set forth in the appended claims.

Although the invention is illustrated and described herein as embodied in a method for adjustment of a substrate in an appliance for carrying out exposure, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
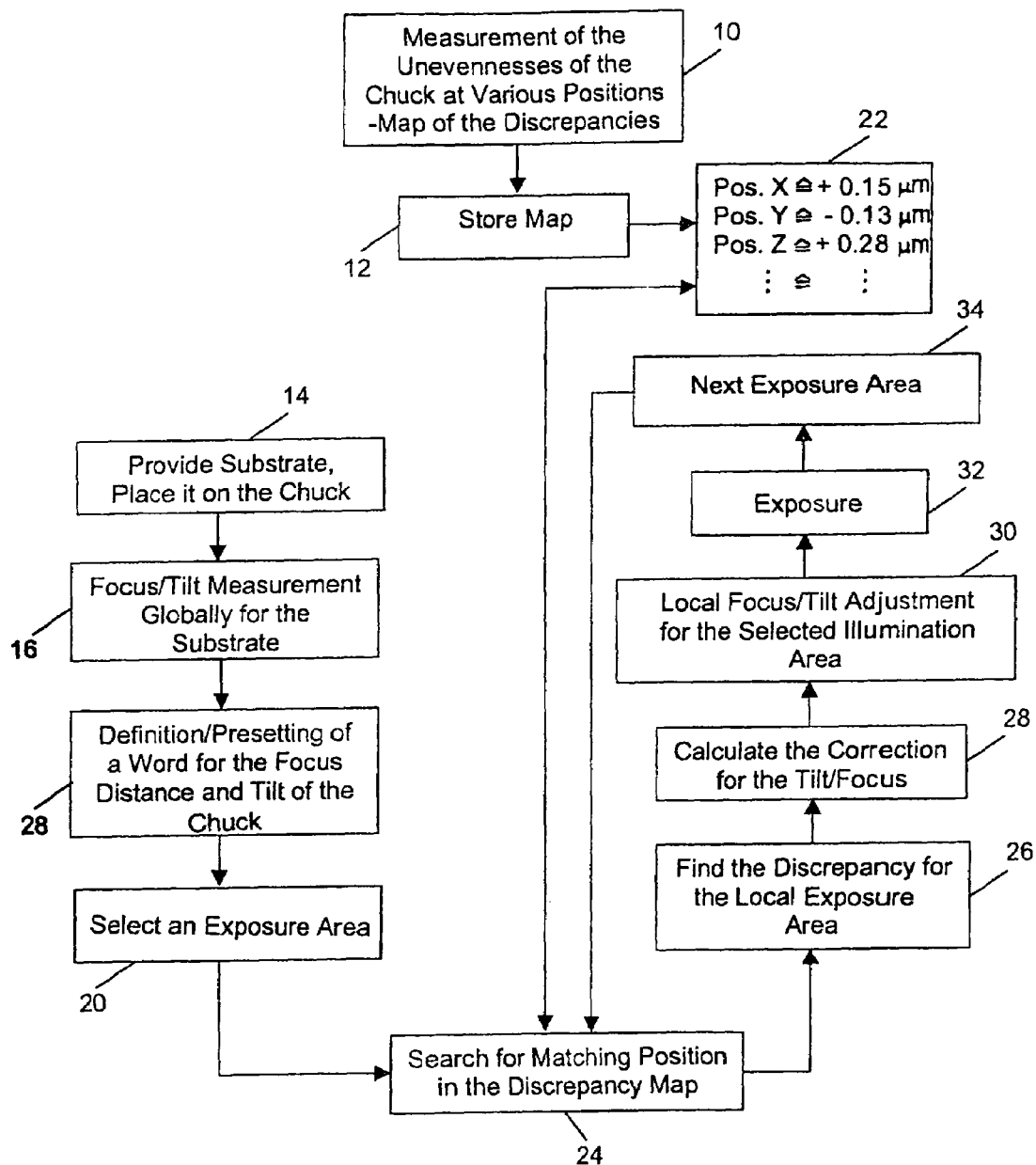
FIG. 1 is a flowchart of an exemplary embodiment of a method for adjusting a substrate in an exposure appliance used for transferring a structure to the substrate.

Referring now to FIG. 1, there is shown a flowchart illustrating one exemplary embodiment of the invention. First of all, a map (Step 10) is to be produced of the unevennesses of a chuck, in a lithographic projection appliance. This is done by determining the discrepancies between the surface and an idealized plane. The exposure or projection appliance has a set of focus/tilt sensors, in each case comprising a laser and a detector, for example a PSD (Position Sensitive Device). The particular tilt as well as the particular focus distance can be calculated from a light beam which is emitted by the laser and is reflected from the surface of a "golden" wafer which is mounted on the chuck.

A three-dimensional map of the surface of the golden wafer is produced from a large number of individual measurements, each at different positions X, Y, Z. An idealized plane may be determined, for example, by linear regression analysis in the three-dimensional data record.

The unevennesses of the golden wafer are recorded as unevennesses of the chuck, since the golden wafer itself has a front and rear face which, although flexible, are parallel to one another, to a high degree of accuracy. The unevennesses and the discrepancies from the idealized plane of the chuck are accordingly transferred directly to the front face of the wafer.

The calculated data record, comprising the map with the discrepancies, is stored as a function of the position in a databank (step 12). The map is associated with the chuck. Manufacturing based on two or more projection appliances, which are each provided with chucks, utilzes a databank in which the maps that are associated with the respective chucks are stored.

Let us assume that a plane is intended to be illuminated for a batch of semiconductor wafers, using this particular projection appliance. A first wafer from the batch is provided in the appliance, and is placed on the chuck of the appliance (step 14). A number of exposure areas are selected on the wafer, for which the sensors are used to carry out a global measurement of the focus distance that is ideal for exposure and of an ideal setting for the tilt (step 16). The ideal focus distance is set automatically by adjustment optics, using a focusing algorithm. The value which is set in this case for the focus distance is stored for each exposure area position.

These values for the focus distance and for the tilt are then averaged. The averaged values are subsequently used globally as exposure presets for the chuck, for all the exposure areas on all the wafers in the batch (step 18).

A first exposure area is now selected (step 20). A matrix of exposure areas is now transferred to a reference coordinate system in a monitoring unit for the projection appliance, as a function of the orientation of the wafer on the chuck (step 22). The first exposure area has position coordinates in it. Next, the stored map of the unevennesses of the chuck is extracted from the databank, and is likewise transferred to the reference coordinate system (also step 22). Ideally, at least one position whose discrepancies from the idealized plane have been measured is located within the area of the selected exposure area (steps 24 and 26).

The measured discrepancy is converted to a correction for the setting of the chuck with respect to the focus distance (step 28). The corrected setting for the chuck is moved to (step 30), and exposure (step 32) with the structures projected from a mask is carried out, by using the adjustment marks that are arranged in the exposure area, before or after fine adjustment within the XY plane of the chuck with that area. The next exposure area can then be addressed (step 34).

Figure 2:
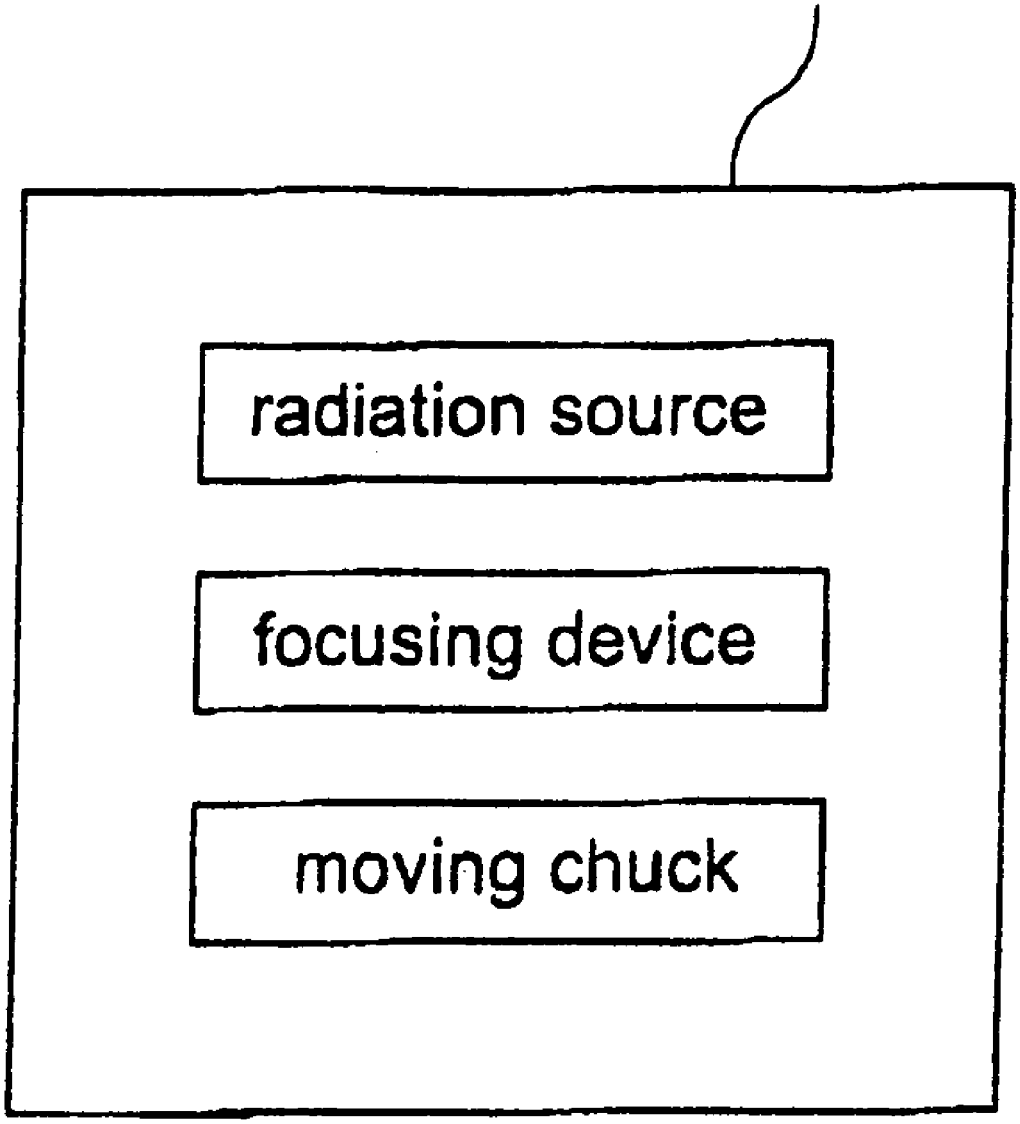
FIG. 2 is a block diagram of an exposure appliance.

FIG. 2 illustrates an exposure appliance, having a radiation source, a focusing device and a moving chuck.

We claim:

1. A method for adjusting a substrate in an exposure appliance used for transferring a structure to the substrate, the appliance including a moving chuck for aligning the substrate, a radiation source, and at least one focusing device, the method which comprises:

for at least one first position on the chuck, obtaining a measured discrepancy by measuring any discrepancy between a surface of the chuck and an idealized plane;

providing the substrate, which is covered with a photosensitive layer, on the chuck such that the surface of the chuck faces the substrate;

selecting a first detail from a plurality of details provided for measuring an ideal focus distance in the photosensitive layer, the first detail representing a first exposure area on the substrate, the selecting step including defining a projected first position by projecting the first position on the chuck into the photosensitive layer and selecting the first detail such that the projected first position is located within or near the first detail;

setting a predetermined limit value for a permissible discrepancy;

comparing the measured discrepancy with the predetermined limit value;

as a function of the comparing step, excluding a detail from the plurality of details provided for measuring the ideal focus distance in the photosensitive layer;

obtaining a measured ideal focus distance by measuring a focus distance being ideal for exposure in at least one further detail from the plurality of details; and moving the chuck to adjust the substrate to the measured ideal focus distance for illuminating the first exposure area.

2. A method for adjusting a substrate in an exposure appliance used for transferring a structure to the substrate, the appliance including a moving chuck for aligning the substrate, a radiation source, and at least one focusing device, the method which comprises:

for at least one first position on the chuck, obtaining a measured discrepancy by measuring any discrepancy between a surface of the chuck and an idealized plane;

providing the substrate, which is covered with a photosensitive layer, on the chuck such that the surface of the chuck faces the substrate;

selecting a first detail including at least one first adjustment mark from a plurality of details in the photosensitive layer, the first detail representing a first exposure area on the substrate, the selecting step including defining a projected first position by projecting the first position on the chuck into the photosensitive layer and selecting the first detail such that the projected first position is located within or near the first detail;

setting a predetermined limit value for a permissible discrepancy;

comparing the measured discrepancy with the predetermined limit value;

as a function of the comparing step, not considering the adjustment mark in the first detail; and based on at least one further adjustment mark, moving the chuck to adjust the substrate in a direction at right angles to a direction of a focus distance for illuminating the first exposure area.

* * * * *